United States Patent

Ahn et al.

[11] Patent Number: 5,887,248
[45] Date of Patent: Mar. 23, 1999

[54] AUDIBLE TONE SIGNAL SERVICE APPARATUS AND METHOD OF A DIGITAL MOBILE SERVICES SWITCHING CENTER

[75] Inventors: Kwang Bok Ahn, Pusan; Chul Ho Jang, Seoul, both of Rep. of Korea

[73] Assignee: Hyundai Electronics Industries Co., Ltd., Rep. of Korea

[21] Appl. No.: 603,897

[22] Filed: Feb. 22, 1996

[30] Foreign Application Priority Data

Apr. 3, 1995 [KR] Rep. of Korea .................... 1995-7760

[51] Int. Cl.⁶ ................... H04Q 7/22; H04Q 7/24
[52] U.S. Cl. .............. 455/403; 455/424; 455/560; 455/550
[58] Field of Search ..................... 455/403, 424, 455/560, 550, 422, 423; 370/249, 525, 526, 375, 366, 376

[56] References Cited

U.S. PATENT DOCUMENTS

| | | | |
|---|---|---|---|
| 4,633,460 | 12/1986 | Suzuki et al. | 370/366 |
| 4,756,018 | 7/1988 | Fujiwara | 455/560 |
| 4,860,281 | 8/1989 | Finley et al. | 370/366 |
| 4,862,452 | 8/1989 | Milton et al. | 370/366 |
| 4,995,033 | 2/1991 | Ikemori | 370/68.1 |
| 5,091,904 | 2/1992 | Back et al. | 370/249 |
| 5,297,191 | 3/1994 | Gerszberg | 379/59 |
| 5,425,031 | 6/1995 | Otsuka | 455/560 |

*Primary Examiner*—Wellington Chin
*Assistant Examiner*—Keith Ferguson
*Attorney, Agent, or Firm*—Fish & Richardsson P.C.

[57] ABSTRACT

An audible tone signal service apparatus of the digital mobile services switching center designs a separate board which transmits audible signal tone only to simplify a hard ware construction of a USTA and to process 32 channel per sheet of the USTA board. Thus, a generally-designed signal processing circuit pack which heretofore processes all R2 MFC, DTMF signal, CCT signal and audible signal tone to inevitably adopt digital signal processors, I/O memories and a receiving sections which were not required for the audible signal tone transmitting service but provided due to the structural aspect of the USTA is separately designed as a board assembly of processing the R2, MFC, DTMF and CCT signals and an audible signal tone transmitting board assembly.

6 Claims, 4 Drawing Sheets

AUDIBLE TONE SIGNAL SERVICE APPARATUS AND METHOD OF A DIGITAL MOBILE SERVICES SWITCHING CENTER

BACKGROUND OF THE INVENTION

1. Field of the Invention

The present invention relates to an audible tone signal service apparatus and method of a digital mobile services switching center (hereinafter simply referred to as "MSC"), and more particularly to an audible tone signal service apparatus and method of a digital MSC for separately designing a board for transmitting only an audible signal in the MSC which uses a code division multiple access (CDMA) system to simplify a hard ware construction of a universal signal transceiver board assembly (hereinafter simply referred to as "USTA"), and processing 32 channels for a single USTA board.

2. Description of the Prior Art

Generally, a general signal processing apparatus used in MSC which is an exchanger of the CDMA system is a signal apparatus for processing every signal received via a time switch. As shown in FIG. 1, the general signal processing apparatus receives to process time slots in respective sub highways SHW from a time-division time switch 1 via a signal processing 0 group USTU 0 and a signal processing 1 group USTU1, respectively, and reports the result of the processing to first and second higher processors 3 and 4 via a telephony device-BUS (hereinafter referred to as TD-BUS). Then, an alarm collecting apparatus 2 connected to respective signal processing groups collects for processing information about the various alarms such as an alarm for warning of an error generated in the USTA board of respective groups, i.e., detachment of the USTA board, while the time slot is provided to respective signal processing groups and an alarm warning of a functional impedient.

The internal construction of the USTA board installed within the general signal processing apparatus is as illustrated in FIG. 2. Here, a pulse code modulation (hereinafter simply referred to as "PCM") data input circuit 5 receives an R2 multi-frequency code (hereinafter referred to as "MFC") provided from the time switch, a dual tone multi frequency (hereinafter referred to as DTMF) signal and continuity check tone (hereinafter referred to as CCT) signals to perform PCM data processing. A clock generator 6 generates clocks to provide a clock required the digital signal processor. A first processing section 7 for processing 8 channel with respect to 16 channel from PCM data input circuit 5 consists of a first digital signal processor 7-1 which receives to detect the signal output via PCM data input circuit 5, and produces signal information with respect to the output signal into a first input/output memory 7-2 which receives the data from first digital signal processor 7-1 to inform a higher processor of the result via a control block, and an EPROM 7-3 which includes a control program therein for controlling first digital signal processor 7-1. Also, a second processing section 8 is identically constructed to first processing section 7 to process the remaining 8 channels with respect to the input 16 channels.

Respective digital signal processors (DSP) 7-1 and 8-1 employed as above adopt 'TMS320C25', which respectively detect 8 channels with respect to respective R2 MFC, DTMF and CCT signals for each chip of DSPs 7-1 and 8-1 and number two per one sheet of the USTA board to function the signal processing service of 16 channels (i.e., 2 (number of DSP)=8 channels=16 channels).

Respective board assemblies (USTAs) of the signal processing apparatus constructed as above are controlled by the higher processor with respect to the signal service function of R2 MFC, DTMF signal, CCT signal tone and audible signal tone to generate a signal to the time switch while detecting and discriminating the signal received from the time switch.

However, the signal processing apparatus functioning as above is formed as the general system as shown in FIG. 1. Therefore, when performing the transmitting service of the audible signal tone, digital signal processors 7-1 and 8-1, I/O memories 7-2 and 8-2, receiving section are not required in actual practice, but are employed due to the USTA structure in spite of the unnecessary function.

SUMMARY OF THE INVENTION

The present invention is devised to solve the above-described problems. Accordingly, it is an object of the present invention to provide an audible signal tone processing apparatus and method of a digital MSC, in which various audible signal tones used for transmitting the connection and proceeding status from the digital MSC to a user are converted in the pattern of PCM data to be stored in an EPROM, and a board for supplying only the stored audible signal tones is separately fabricated to provide a printing board assembly (hereinafter referred to as PBA) which simplifies and integrates the overall system signal processing section.

To achieve the above object of the present invention, there is provided a signal processing pack of a digital mobile services switching center, in which an audible tone signal service apparatus of the digital mobile services switching center includes a TD-BUS interface section for connecting a TD-BUS of an higher processor side to a control section which controls overall sections and controls to transmit the suitable signal tone to a user. A transmitting section provides the audible signal tone to be transmitted to a sub-highway connecting section under the control of the control section, in which the sub-highway connecting section connects a time-division time switch block with respective sections. Also, a loop-back circuit section examines a path of the corresponding board assembly in an on-line state to check reliability of the board assembly.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENTS

Figure 1:
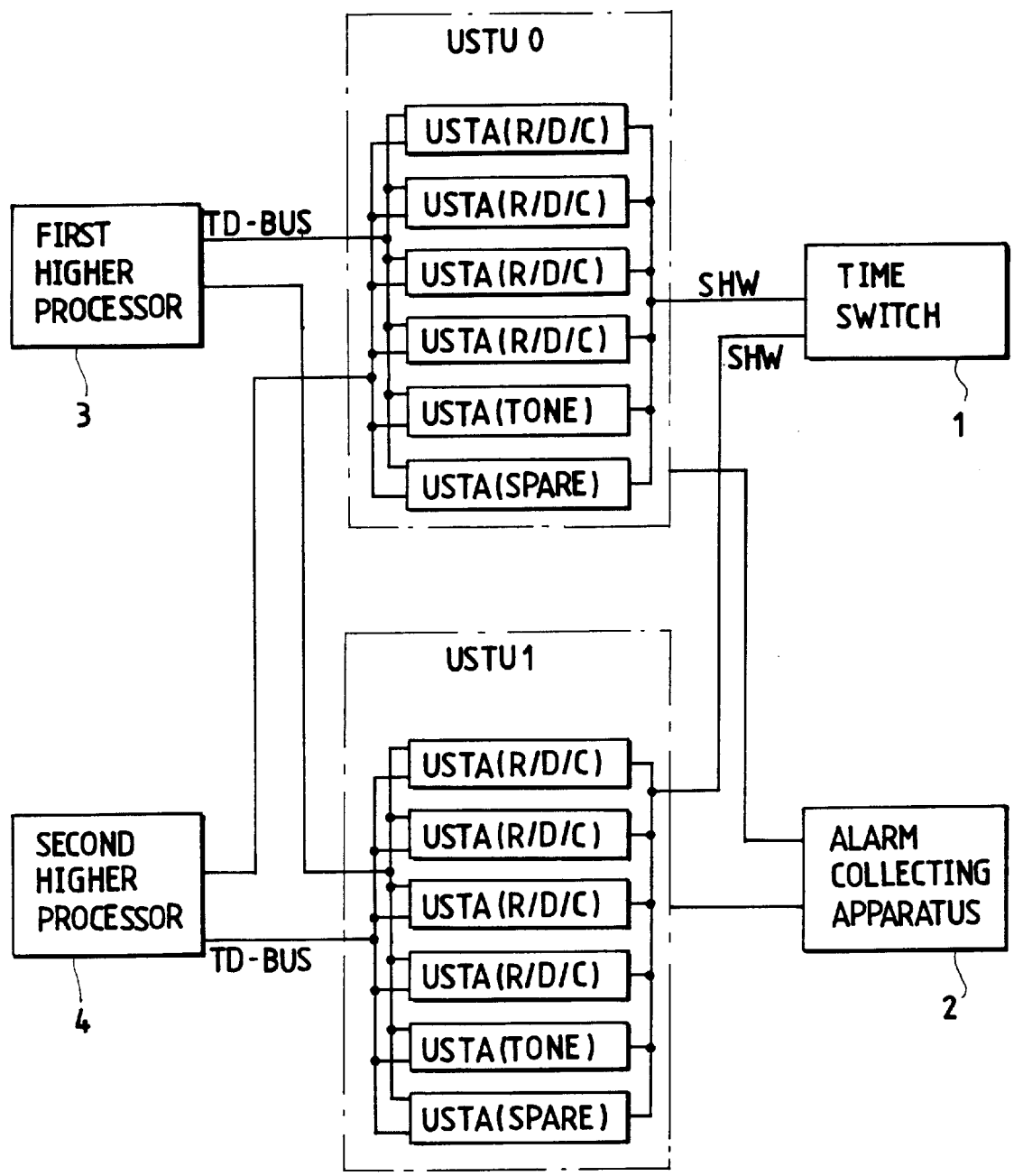
FIG. 1 is a block diagram showing a construction of a conventional general signal service apparatus.
Figure 2:
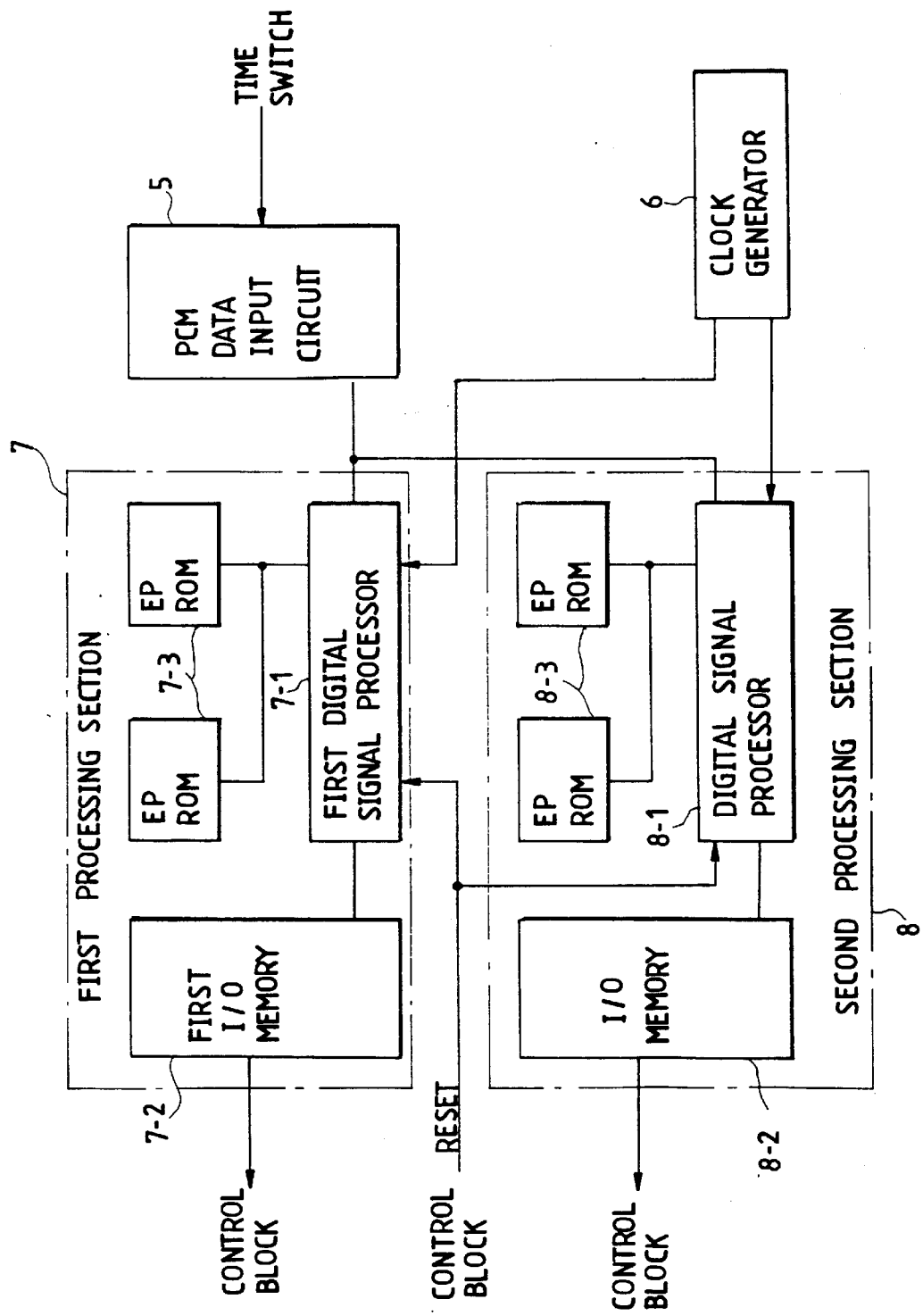
FIG. 2 is a block diagram showing an internal construction of the conventional USTA.
Figure 3:
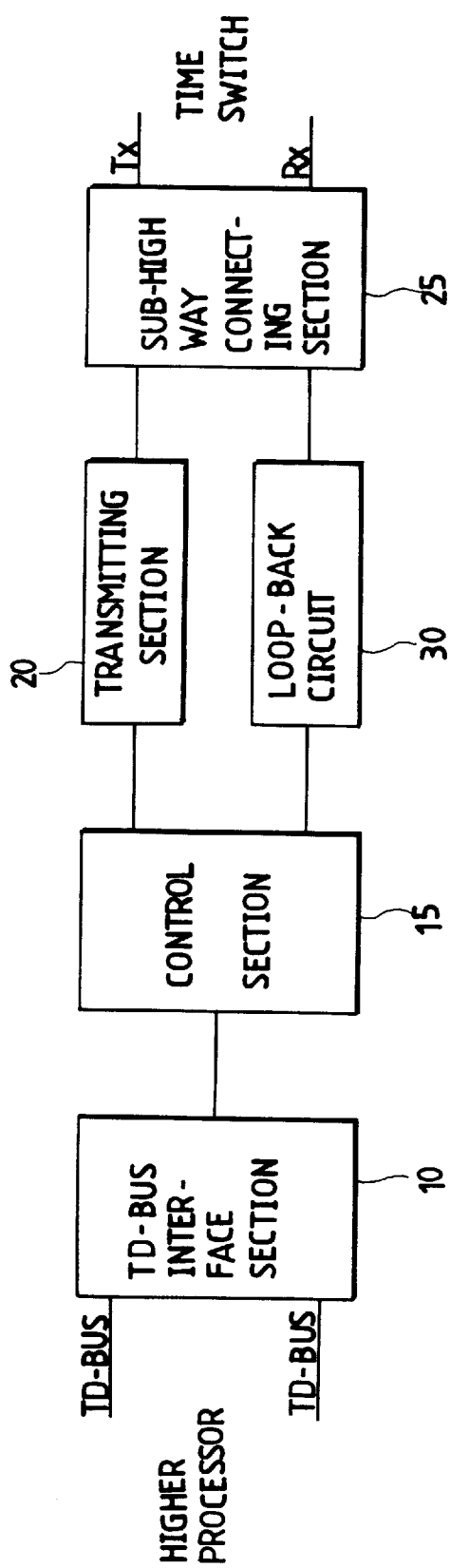
FIG. 3 is a block diagram showing an overall construction of an audible signal tone apparatus according to the present invention.

An audible tone signal service apparatus and method of a digital MSC according to the present invention will be described in detail with reference to accompanying drawings, in which the same parts FIG. 3 is a block diagram showing an overall construction of the audible signal tone apparatus according to the present invention. Here, a TD-BUS interface section 10 connects a TD-BUS of an higher processor side to a control section 15, and control section 15 controls respective sections, and controls transmission of a proper audible signal tone to a user, a transmitting section 20 provides an audible signal tone to be transmitted to a sub-highway connecting section 25 under the control of control section 15. Sub-highway connecting section 25 connects a time-division time switch block and respective blocks. A loop-back circuit 30 examines a path of the corresponding board assembly in the on-line state to check reliability of the corresponding board assembly.

Figure 4:
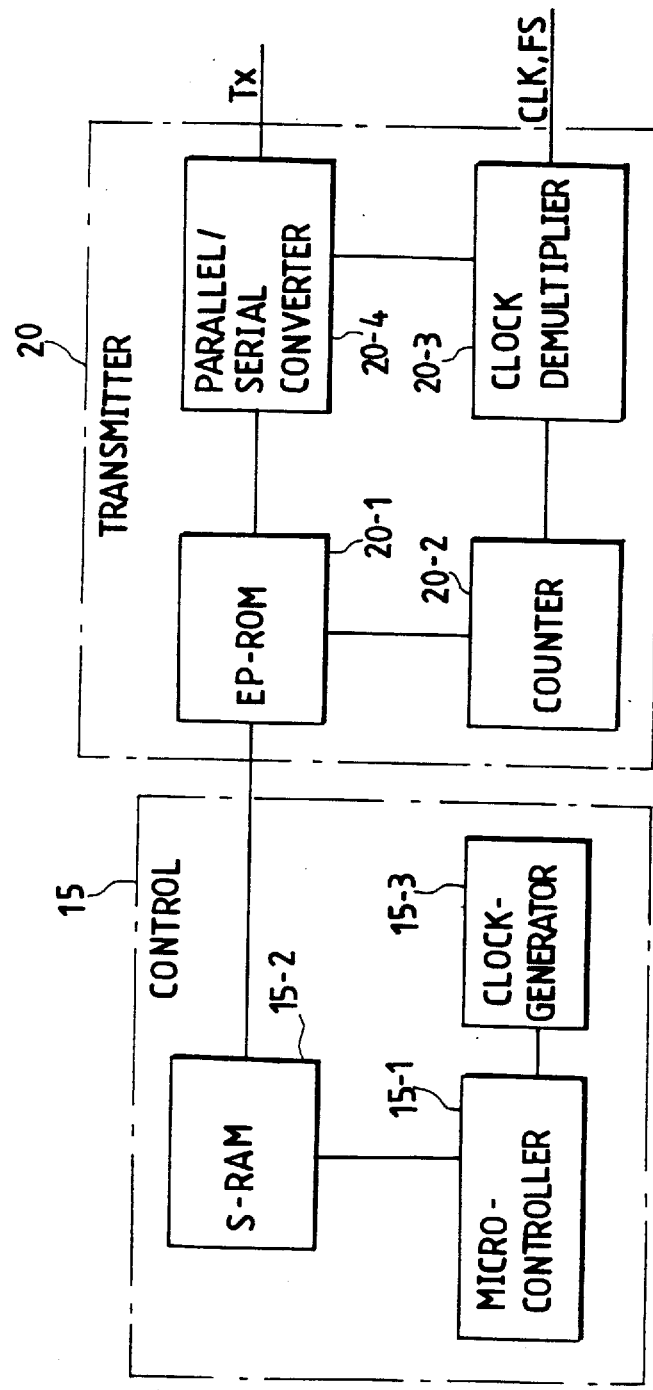
FIG. 4 is a block diagram showing the internal structure of the control section and transmitting section of the audible signal tone apparatus.

FIG. 4 is a detailed block diagram showing control section 15 and transmitting section 20 shown in FIG. 3.

Here, control section 15 includes a micro-controller 15-1 for allowing proper data in the PCM data stored in an EPROM 20-1 of transmitting section 20 to be provided when an audible signal tone mode is set by the higher processor. In addition, an S-RAM 15-2 is a basic memory utilized when micro-controller 15-1 is operated, and a clock generator 15-3 provides a clock required in micro-controller 15-1.

Transmitting section 20 includes EPROM 20-1 for storing the audible signal tone in the pattern of the PCM data, and a counter 20-2 for initiating a counting operation when the data stored in EPROM 20-1 is provided as a kind of a single audible signal tone. A clock demultiplier 20-3 receives the clock from the time switch via sub-highway connecting section 25 to demultiply the frequency. Then, a parallel/serial converter 20-4 converts a parallel signal from EPROM 20-1 to a serial signal to supply the result.

An operation of the audible signal tone service apparatus constructed as above is performed as below.

Communication between the higher processor and control section 15 is performed via TD-BUS interface section 10 by means of the RS-485 interface system such that, when the audible signal tone mode is set by the higher processor, control section 15 transmits the PCM data stored in EPROM 20-1 of transmitting section 20 to the time-division time switch via sub-highway connecting section 25 by means of the look-up table system.

When the PCM data stored in EPROM 20-1 under the control of control section 15 as described above, counter 20-2 is operated by clock demultiplier 20-3 which demultiplies a 4 MHz clock and an 8 KHz frame sync received via the time switch to count from zero to 2047 by 2048 times. Upon the completion of this counting operation, the data stored in EPROM 20-1 is loaded, and counter 20-2 is reset to start the counting again.

After the data is loaded via the above-described process, the PCM data is converted into the serial signal via parallel/serial converter 20-4 to be supplied to sub-highway connecting section 25, successively transmitted to the user via the time-division time switch.

Moreover, the audible signal tone apparatus according to the present invention is equipped with loop-back circuit 30 installed for testing performance of the inherent system, which is a unit for examining a path of the board assembly to check the reliability of the board assembly in the on-line state. EPROM 20-1 included in transmitting section 20 is formed of 1 Mbytes for facilitating spread of the audible signal tone.

As a reference, standards of a frequency, level and interrupt ratio per audible tone type transmitted from an exchange office to the user are represented as the following table.

<Standards of frequency, level, interrupt ratio per tone type>

| Audible tone type | Frequency | Level (dBm) | Interrupt ratio (sec.) | Channel No. |
|---|---|---|---|---|
| Dial tone | 350 + 440 | −10 +/− 5 | Successive | 0 |
| Immediate ringing signal | 350 + 440 | −15 +/− 5 | Successive | 1 |
| Ringing signal | 440 + 480 | −15 +/− 5 | Tone on for 1 - tone off for 2 | 2 |
| Busy signal | 480 + 620 | −20 +/− 5 | On for 0.5 - off for 0.5 | 3 |
| Trunk line congestion signal | 480 + 620 | −20 +/− 5 | On for 0.3 - off for 0.2 | 4 |
| Queuing signal | 350 + 440 | −10 +/− 5 | On for 0.25 - off for 0.25 on for 0.25 - off for 3.25 | 5 |
| Holding tone | 440 + 480 350 + 440 | −10 +/− 5 | On for 0.5 - off for 0.5 | 6 |
| Confirm tone | 392,494, 587 | −10 +/− 5 | On for 0.5 - off for 0.5 - on for 0.5 | 7 |
| Transceiver leaving tone | 1400 + 2050 + 2450 + 2600 | 0 +/− 2 | On for 0.1 - off for 0.1 | 8 |
| Snatch tone | 350 + 440 | −10 +/− 5 | On for 0.125 - off for 0.25 on for 0.125 - off for 1.5 | 9 |
| Bit tone | 587 | −10 +/− 5 | Successive | 10 |
| Reserved tone | 440 + 490 | −10 +/− 5 | On for 1 - off for 1 | 11 |
| Error tone | 480 + 620 | −20 +/− 5 | on for 0.3 - off for 0.2 | 12 |
| Release tone in withhold | 494 | −10 +/− 5 | on for 0.25 - off for 0.25 | 13 |
| Automatic answering machine tone | 1000 | −10 +/− 5 | Successive | 14 |
| Special dial tone | 392/494/ 587 350 + 440 | −10 +/− 5 | 0.5/0.5/1.5 repeat twice and transmit dial tone | 15 |
| Extension dial tone | 350 + 440 | −10 +/− 5 | On for 1 - off for 0.25 | 16 |

Since the audible signal tone board assembly is separately fabricated, it is required to design the hard ware such that the audible signal tone only can be separately transmitted while eliminating the receiving section added during constituting the conventional USTA board assembly.

In the present invention as described above, the signal processing board assembly which has been heretofore designed for a general application is designed to separate the R2 MFC, DTMF and CCT signal processing board assembly and audible signal tone transmitting board assembly, so that the unnecessary circuit is omitted to simplify and integrate the circuit of the hard ware.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A signal processing pack of a digital mobile services switching center, comprising:
   one or more signal service processors; and
   a dedicated audible tone signal service transmission apparatus, said one or more signal service processors and said dedicated audible tone signal service transmission apparatus connected in parallel with each having an input receiving a signal from a higher processor and each having an output sending a signal to a user via a time-division switch block, said transmission apparatus including:

an audible tone signal control section dedicated to controlling other sections of the audible tone signal transmission apparatus and selecting a suitable audible tone signal;

a TD-BUS interface section for connecting a TD-BUS of the higher processor to the control section;

a transmitting section for providing a suitable audible tone signal to be transmitted to the time-division switch block under the control of said control section;

a sub-highway connecting section for connecting the time-division switch block with the transmitting section; and a loop-back circuit section for examining a path of a corresponding board assembly in an on-line state to check reliability of said board assembly.

2. The signal processing pack of claim 1, wherein said audible tone signal control section comprises:

a micro-controller for selecting suitable audible signal tone PCM data stored in an EPROM of said transmitting section when an audible signal tone mode is set by said higher processor;

an SRAM being a basic memory used when the said micro-controller is operated; and a clock generator for generating clock signals required by said micro-controller.

3. The signal processing pack of claim 1, wherein said transmitting section comprises:

an EPROM for storing audible signal tone PCM data;

a counter for starting a counting operation when the audible signal tone PCM data stored in said EPROM is selected;

a clock demultiplier for demultiplying a clock signal received from said time-division switch block via said sub-highway connecting section; and a parallel/serial converter for converting a parallel signal from said EPROM into a serial signal to be output.

4. A signal processing pack of a digital mobile services switching center, comprising:

one or more signal service processors; and a unidirectional audible tone signal service transmission apparatus, said one or more signal service processors and said dedicated audible tone signal service transmission apparatus connected in parallel, with each having an input receiving a signal from a higher processor and each having an output sending a signal to a user via a time-division switch block, said unidirectional transmission apparatus including:

an audible tone signal control section controlling other sections of the audible tone signal transmission apparatus and selecting a suitable audible tone signal;

a TD-BUS interface section for connecting a TD-BUS of the higher processor to the control section;

a transmitting section for providing a suitable audible tone signal to be transmitted to the time-division switch block under the control of said control section;

a sub-highway connecting section for connecting the time-division switch block with the transmitting section; and a loop-back circuit section for examining a path of a corresponding board assembly in an on-line state to check reliability of said board assembly.

5. The signal processing pack of claim 1, wherein said signal service processors are universal signal transceiver assemblies (USTA).

6. The signal processing pack of claim 4, wherein said signal service processors are universal signal transceiver assemblies (USTA).

* * * * *